(12) United States Patent
Kim et al.

(10) Patent No.: US 9,383,870 B2
(45) Date of Patent: Jul. 5, 2016

(54) TOUCH PANEL AND TOUCH SCREEN APPARATUS INCLUDING THE SAME

(71) Applicant: SAMSUNG ELECTRO-MECHANICS CO., LTD., Suwon (KR)

(72) Inventors: Hyun Jun Kim, Suwon (KR); Sang Hwan Oh, Suwon (KR); Tah Joon Park, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 7 days.

(21) Appl. No.: 14/190,439

(22) Filed: Feb. 26, 2014

(65) Prior Publication Data

US 2015/0177873 A1 Jun. 25, 2015

(30) Foreign Application Priority Data

Dec. 24, 2013 (KR) .......................... 10-2013-0162234

(51) Int. Cl.
*G06F 3/044* (2006.01)

(52) U.S. Cl.
CPC ...... *G06F 3/044* (2013.01); *G06F 2203/04112* (2013.01)

(58) Field of Classification Search
CPC .................. G06F 3/044; G06F 2203/04112
See application file for complete search history.

(56) References Cited

U.S. PATENT DOCUMENTS

| 8,405,633 | B2 | 3/2013 | Geaghan | |
|---|---|---|---|---|
| 2010/0309162 | A1 | 12/2010 | Nakanishi et al. | |
| 2011/0102370 | A1* | 5/2011 | Kono | G06F 3/044 345/174 |
| 2012/0193130 | A1* | 8/2012 | Fix | G06F 3/047 174/255 |
| 2012/0262412 | A1* | 10/2012 | Guard et al. | 345/174 |
| 2012/0293430 | A1* | 11/2012 | Kitada | 345/173 |
| 2013/0234974 | A1* | 9/2013 | Guard | 345/174 |
| 2013/0327560 | A1* | 12/2013 | Ichiki | 174/133 R |
| 2014/0118009 | A1* | 5/2014 | Cheng et al. | 324/658 |
| 2014/0139761 | A1* | 5/2014 | Yanagawa et al. | 349/12 |

FOREIGN PATENT DOCUMENTS

| JP | 2010-282501 A | 12/2010 |
|---|---|---|
| JP | 2012-33147 A | 2/2012 |
| JP | 2012-243058 A | 12/2012 |
| KR | 10-2011-01272361 | 11/2011 |
| KR | 10-2012-0121792 | 11/2012 |
| WO | WO 2010/099132 | 9/2010 |

OTHER PUBLICATIONS

Japanese Office Action issued on Apr. 28, 2015, in counterpart Japanese Application No. 2014-041818 (4 pages in English, 2 pages in Japanese).

* cited by examiner

*Primary Examiner* — Amr Awad
*Assistant Examiner* — Stephen Bray
(74) *Attorney, Agent, or Firm* — NSIP Law

(57) ABSTRACT

There are provided a touch panel and a touch screen apparatus. The touch panel may include: a substrate; a plurality of first electrodes disposed on a lower surface of the substrate and extended in a first direction; and a plurality of second electrodes disposed on an upper surface of the substrate and extended in a second direction intersecting with the first direction, wherein the first and second electrodes include conductor wires formed in a mesh shape, a pitch of the conductor wire of the second electrode is larger than that of the conductor wire of the first electrode, and the conductor wire of the second electrode forms a single line shape with a portion of the conductor wire of the first electrode at an intersection region between the first and second electrodes.

17 Claims, 8 Drawing Sheets

TOUCH PANEL AND TOUCH SCREEN APPARATUS INCLUDING THE SAME

CROSS-REFERENCE TO RELATED APPLICATION

This application claims the benefit of Korean Patent Application No. 10-2013-0162234 filed on Dec. 24, 2013, with the Korean Intellectual Property Office, the disclosure of which is incorporated herein by reference.

BACKGROUND

The present disclosure relates to a touch panel and a touch screen apparatus including the same.

A touch screen apparatus such as a touch screen, a touch pad, or the like, which is an input apparatus attached to a display apparatus to provide an intuitive input method to a user, has recently been widely used in various electronic devices such as a cellular phone, a personal digital assistant (PDA), a navigation device, or the like. Particularly, as the demand for smart phones has recently increased, as a touch screen apparatus capable of providing various input methods in a limited form factor, usage of the touch screen has been increasing day by day.

A touch screen used in a portable device may be mainly divided into a resistive type touch screen and a capacitive type touch screen according to a method of sensing a touch input. Here, the capacitive type touch screen has advantages in that it has a relatively long lifespan and may easily implement various input methods and gestures, such that the use thereof has increased consistently. Particularly, the capacitive type touch screen may more easily implement a multi-touch interface as compared to the resistive type touch screen, such that it is widely used in devices such as a smart phone, and the like.

The capacitive type touch screen includes a plurality of electrodes having a predetermined pattern and defining a plurality of nodes at which a change in capacitance is generated by a touch input. At the plurality of nodes distributed on a two-dimensional plane, a change in self-capacitance or mutual-capacitance is generated by the touch input. A coordinate of the touch input may be calculated by applying a weighted average method, or the like, to the change in the capacitance generated at the plurality of nodes.

In a touch panel according to the related art, generally, a sensing electrode recognizing touch is formed of indium tin oxide (ITO). However, since indium is a rare earth metal, ITO is expensive, such that price competitiveness may be low, and indium is expected to be depleted within the next decade, such that indium may not be sufficiently supplied. Due to the above-mentioned reasons, research into a method of forming an electrode using an opaque conductor thin line has been conducted. The electrode formed of a conductive thin line such as a metal has advantages in that electric conductivity is significantly excellent as compared to an electrode formed of ITO or a conductive polymer and the conductive thin line may be sufficiently supplied.

However, unlike an ITO electrode having a predetermined area, since the electrode formed of the conductor thin line is formed of a thin line, the electrode may be vulnerable to noise introduced through a contact object and a liquid crystal display (LCD) noise.

RELATED ART DOCUMENT (Patent Document 1) US Patent Publication No. 8405633

SUMMARY

An aspect of the present disclosure may provide a touch panel and a touch panel apparatus in which a first electrode disposed on a lower surface of a substrate has the same width as that of a second electrode disposed on an upper surface of the substrate, a conductor wire of the first electrode has a pitch smaller than that of a conductor wire of the second electrode, and the conductor wire of the second electrode forms a line shape together with a portion of the conductor wire of the first electrode.

According to an aspect of the present disclosure, a touch panel may include: a substrate; a plurality of first electrodes disposed on a lower surface of the substrate and extended in a first direction; and a plurality of second electrodes disposed on an upper surface of the substrate and extended in a second direction intersecting with the first direction, wherein the first and second electrodes include conductor wires formed in a mesh shape, a pitch of the conductor wire of the second electrode is larger than that of the conductor wire of the first electrode, and the conductor wire of the second electrode forms a single line shape with a portion of the conductor wire of the first electrode at an intersection region between the first and second electrodes.

Widths of the first and second electrodes may be identical to each other.

The pitch of the conductor wire of the second electrode may be 2 to 4 times the pitch of the conductor wire of the first electrode.

The pitch of the conductor wire of the second electrode may be 3 times the pitch of the conductor wire of the first electrode.

The pitch of the conductor wire of the first electrode may be 300 μm to 500 μm.

A line width of the conductor wire of the first electrode may be wider than that of the conductor wire of the second electrode.

The line width of the conductor wire of the first electrode may be 5 μm.

The line width of the conductor wire of the second electrode may be 3 μm.

According to another aspect of the present disclosure, a touch screen apparatus may include: a panel unit including a plurality of first electrodes disposed on a lower surface of a substrate and extended in a first direction and a plurality of second electrodes disposed on an upper surface of the substrate and extended in a second direction intersecting with the first direction; and a controlling unit applying predetermined driving signals to the plurality of first electrodes and detecting capacitance from the plurality of second electrodes to determine touch input, wherein the first and second electrodes include conductor wires formed in a mesh shape, a pitch of the conductor wire of the second electrode is larger than that of the conductor wire of the first electrode, and the conductor wire of the second electrode forms a single line shape with a portion of the conductor wire of the first electrode at an intersection region between the first and second electrodes.

Widths of the first and second electrodes may be identical to each other.

The pitch of the conductor wire of the second electrode may be 2 to 4 times the pitch of the conductor wire of the first electrode.

The pitch of the conductor wire of the second electrode may be 3 times the pitch of the conductor wire of the first electrode.

The pitch of the conductor wire of the first electrode may be 300 μm to 500 μm.

A line width of the conductor wire of the first electrode may be wider than that of the conductor wire of the second electrode.

The line width of the conductor wire of the first electrode may be 5 μm.

The line width of the conductor wire of the second electrode may be 3 μm.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
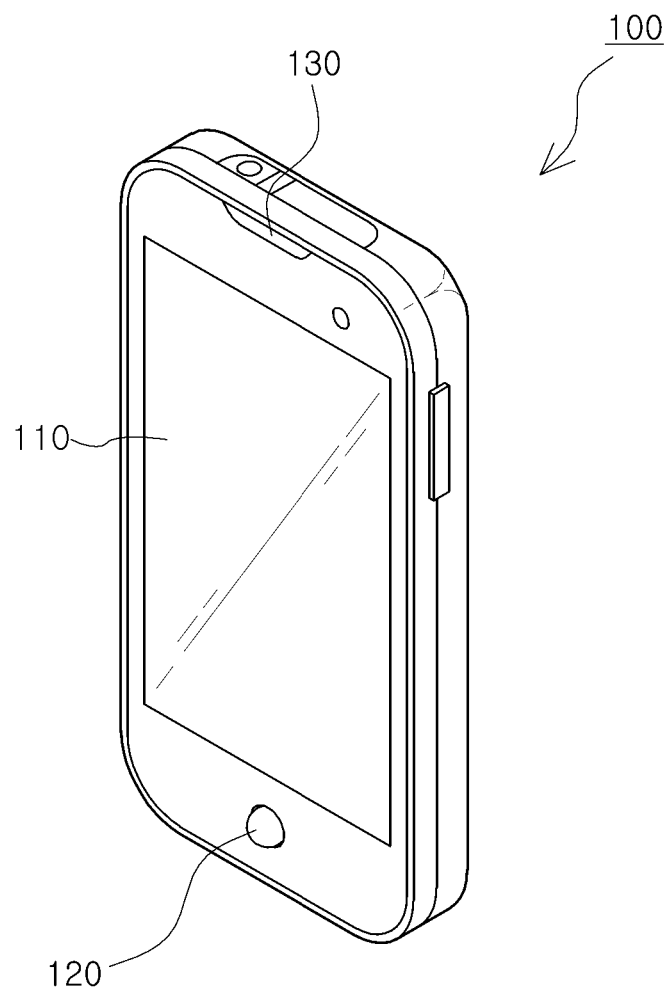
FIG. 1 is a perspective view illustrating an appearance of an electronic device including a touch screen apparatus according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

FIG. 1 is a perspective view illustrating an appearance of an electronic device including a touch screen apparatus according to an exemplary embodiment of the present disclosure.

Referring to FIG. 1, the electronic device 100 according to an exemplary embodiment of the present disclosure may include a display apparatus 110 for outputting a screen, an input part 120, an audio part 130 for outputting an audio, and a touch sensing apparatus integrated with the display apparatus 110.

As illustrated in FIG. 1, in the case of a mobile device, the touch screen apparatus may be generally provided in a state in which it is integrated with the display apparatus and needs to have light transmittance high enough to transmit a screen displayed by the display apparatus. Therefore, the touch screen apparatus may be implemented by forming an electrode using a material having electric conductivity on a transparent substrate formed using a film formed of polyethylene terephthalate (PET), polycarbonate (PC), polyethersulfone (PES), polyimide (PI), polymethylmethacrylate (PMMA), cyclo-olefin polymers (COP), or the like, or a material such as soda glass or tempered glass. A wiring pattern connected to the electrode formed of an electric conductive material is disposed in a bezel region of the display apparatus and visually shielded by the bezel region.

Since it is assumed that the touch screen apparatus according to an exemplary embodiment of the present disclosure operates in a capacitive scheme, the touch screen apparatus may include a plurality of electrodes having a predetermined pattern. In addition, the touch screen apparatus may include a capacitance sensing circuit for detecting a change in capacitance generated in the plurality of electrodes, an analog-digital converting circuit converting an output signal of the capacitance sensing circuit into a digital value, an operational circuit determining a touch input using the converted digital value, and the like.

Figure 2:
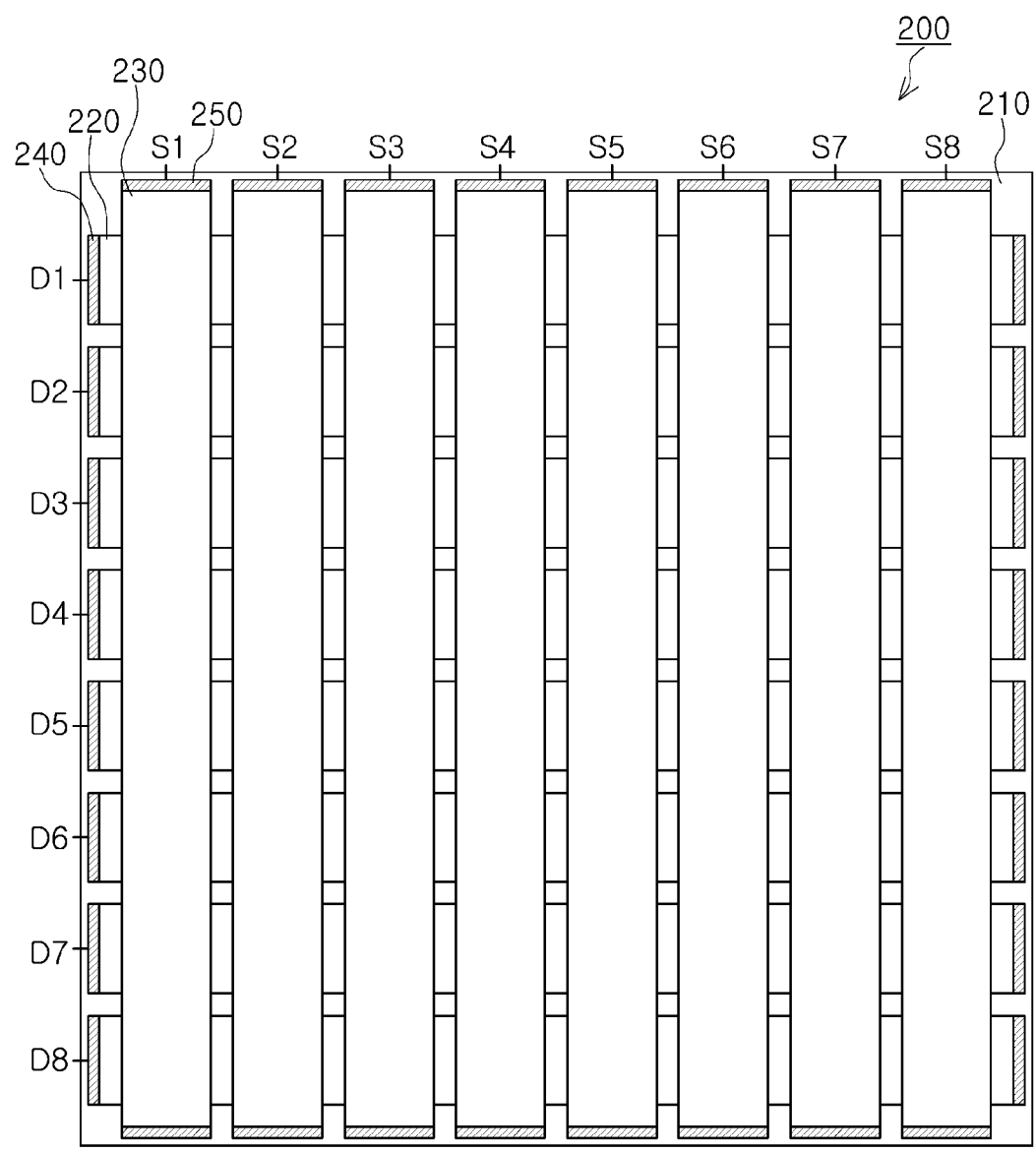
FIG. 2 is a view illustrating a touch panel capable of being included in the touch screen apparatus according to the exemplary embodiment of the present disclosure.

FIG. 2 is a view illustrating a touch panel capable of being included in the touch screen apparatus according to the exemplary embodiment of the present disclosure.

Referring to FIG. 2, the touch panel 200 according to this exemplary embodiment may include a substrate 210, a plurality of electrodes 220 and 230 provided on the substrate 210, and a plurality of pads 240 and 250 connected to the plurality of electrodes 220 and 230, respectively. Although not illustrated in FIG. 2, the plurality of pads 240 and 250 connected to the plurality of electrodes 220 and 230, respectively, may be electrically connected to a wiring pattern of a circuit board attached to one end of the substrate 210 through wirings and a bonding pad. The circuit board may be mounted with a controller integrated circuit—a controlling unit—to detect sensing signals generated in the plurality of electrodes 220 and 230 and judge touch inputs from the sensing signals.

The substrate 210 may be a transparent substrate for forming the plurality of electrodes 220 and 230. Therefore, as described above, the substrates 210 may be formed using the film formed of polyethylene terephthalate (PET), polycarbonate (PC), polyethersulfone (PES), polyimide (PI), polymethylmethacrylate (PMMA), cyclo-olefin polymers (COP), or the like, or the material such as soda glass or tempered glass.

The plurality of electrodes 220 and 230 may include first electrodes 220 extended in an X axis direction and second electrodes 230 extended in a Y axis direction. The first and second electrodes 220 and 230 may be provided on both surfaces of the substrate 210 or provided on different substrates 210 to intersect with each other. In the case in which the first electrodes and second electrodes 220 and 230 are provided on one surface of the substrate 210, a predetermined insulating layer may be partially formed at intersection points between the first and second electrodes 220 and 230. In addition, unlike the above-mentioned case, the first and second electrodes 220 and 230 may be provided on different substrates to intersect with each other.

In addition, except for regions at which the plurality of electrodes 220 and 230 are formed, a predetermined printing region for visually shielding the wiring generally formed of an opaque metal material may be formed on the substrate 210 with respect to regions on which the plurality of pads 240 and 250 connected to the plurality of electrodes 220 and 230, respectively, are provided.

An apparatus electrically connected to the plurality of electrodes 220 and 230 to sense the touch input may detect the change in capacitance generated in the plurality of electrodes 220 and 230 by the touch input and sense the touch input from the detected change. The first electrodes 220 may be connected to channels defined as D1 to D8 in the controller integrated circuit to thereby be applied with predetermined driving signals, and the second electrodes 230 may be connected to channels defined as S1 to S8 to thereby be used for the touch sensing apparatus to detect a sensing signal. Here, the controller integrated circuit may detect a change in mutual-capacitance generated between the first and second electrodes 220 and 230 as the sensing signal and be operated in a scheme in which the driving signals are sequentially applied to each of the first electrodes 220 and the changes in capacitance are simultaneously detected in the second electrodes 230.

Figure 3:
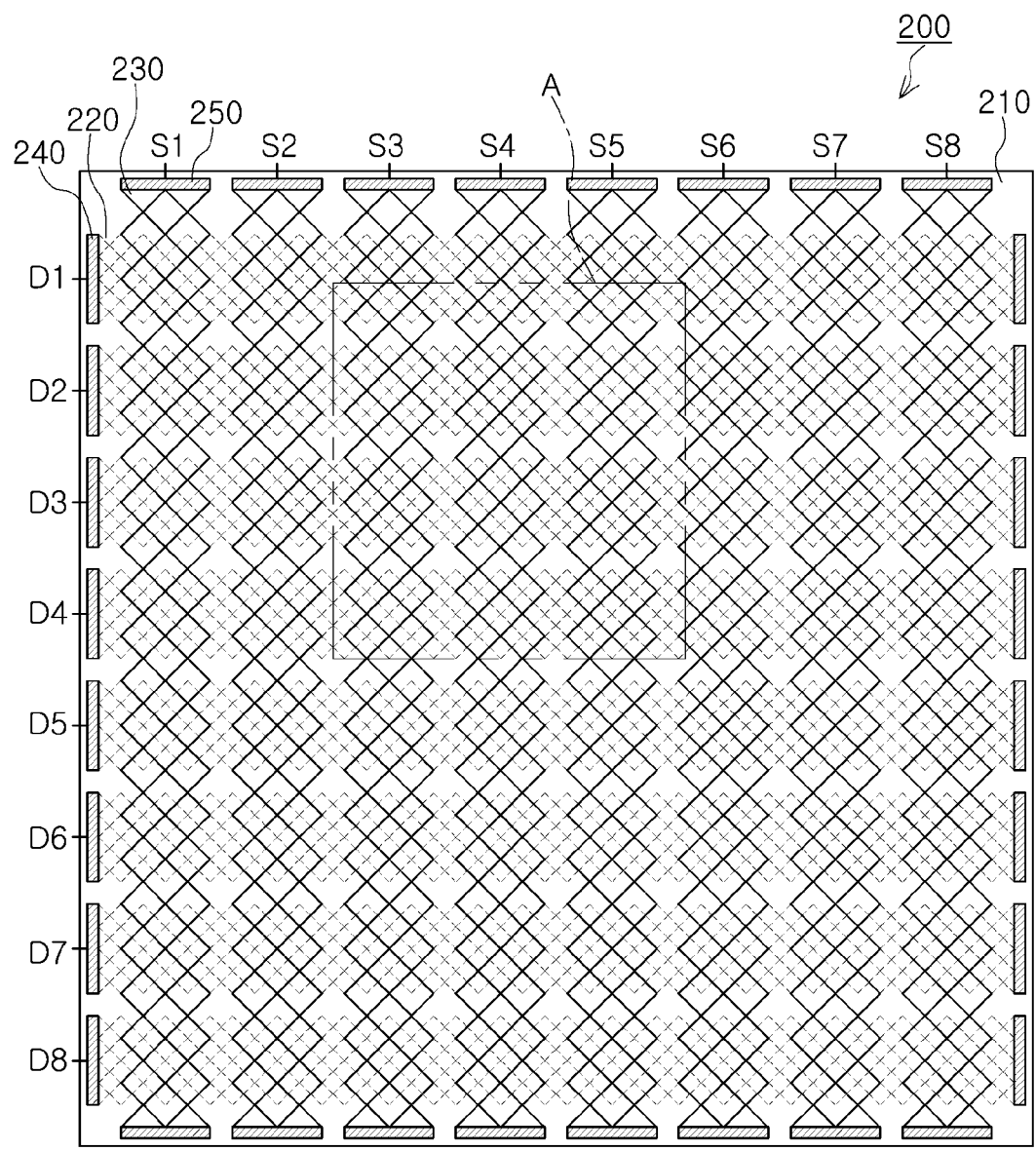
FIG. 3 is a view illustrating the touch panel of FIG. 2 in detail.

FIG. 3 is a view illustrating the touch panel of FIG. 2 in detail. Referring to FIG. 3, the plurality of electrodes 220 and 230 may include a conductor wire, and the conductor wire configuring the plurality of electrodes 220 and 230 may be formed in a net or mesh shape. Since the conductor wire is formed in the net or mesh shape, a phenomenon in which a patterning mark is illustrated in a region in which an indium-tin oxide (ITO) electrode according to the related art is present may be decreased, and transmittance properties of the touch panel may be improved.

Although the case in which the conductor wire configuring the plurality of electrodes 220 and 230 is formed in a trapezoidal shape or a tetragonal shape is illustrated in FIG. 3, the conductor wire is not limited thereto, and cases clearly or easily derived by those skilled in the art, for example, the cases in which the conductor wire is formed in a hexagonal shape, an octagonal shape, a diamond shape, a random shape, and the like, are also included in the present disclosure.

The conductor wire configuring the plurality of electrodes 220 and 230 may be manufactured using any one of silver (Ag), aluminum (Al), chromium (Cr), nickel (Ni), molybdenum (Mo), and copper (Cu) or an alloy thereof. The plurality of electrodes 220 and 230 are formed of the metal, such that a resistance value of the electrode may be decreased, thereby improving conductivity and detection sensitivity.

Figure 4:
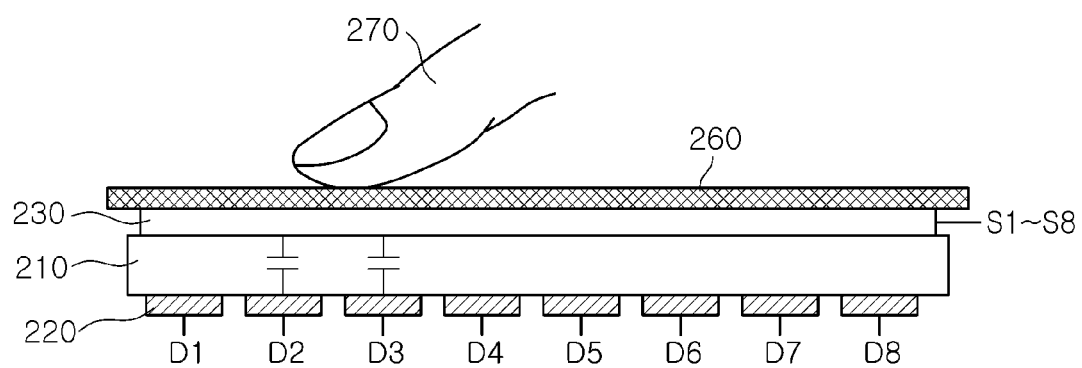
FIG. 4 is a cross-sectional view of the touch panel illustrated in FIGS. 2 and 3.

FIG. 4 is a cross-sectional view of the touch panel illustrated in FIGS. 2 and 3, and the touch panel may further include a cover lens 260 applied with a touch in addition to the substrate 210, the plurality of electrodes 220 and 230, and the plurality of pads 240 and 250 (not shown) that are described with reference to FIGS. 2 and 3. The cover lens 260 may be provided on the first electrode 220 used to detect the sensing signal to thereby be applied with the touch input from a contact object 270 such as a finger, or the like.

When the driving signal is sequentially applied to the first electrodes 220 through the channels D1 to D8, the mutual-capacitance may be generated between the first electrodes 220 applied with the driving signal and the second electrodes 230. When the driving signal is sequentially applied to the first electrodes 220, a change in capacitance may be generated in the mutual-capacitance generated between the first electrode 220 adjacent to a region contacted by the contact object 270 and the second electrode 230. The change in the capacitance may be proportional to an area of an overlapped region between the contact object 270, the first electrode 220 applied with the driving signal, and the second electrode 230. In FIG. 4, the mutual-capacitance generated between the first electrodes 220 and the second electrodes 230 connected to the channels D2 and D3, respectively, is affected by the contact object 270.

Figure 5:
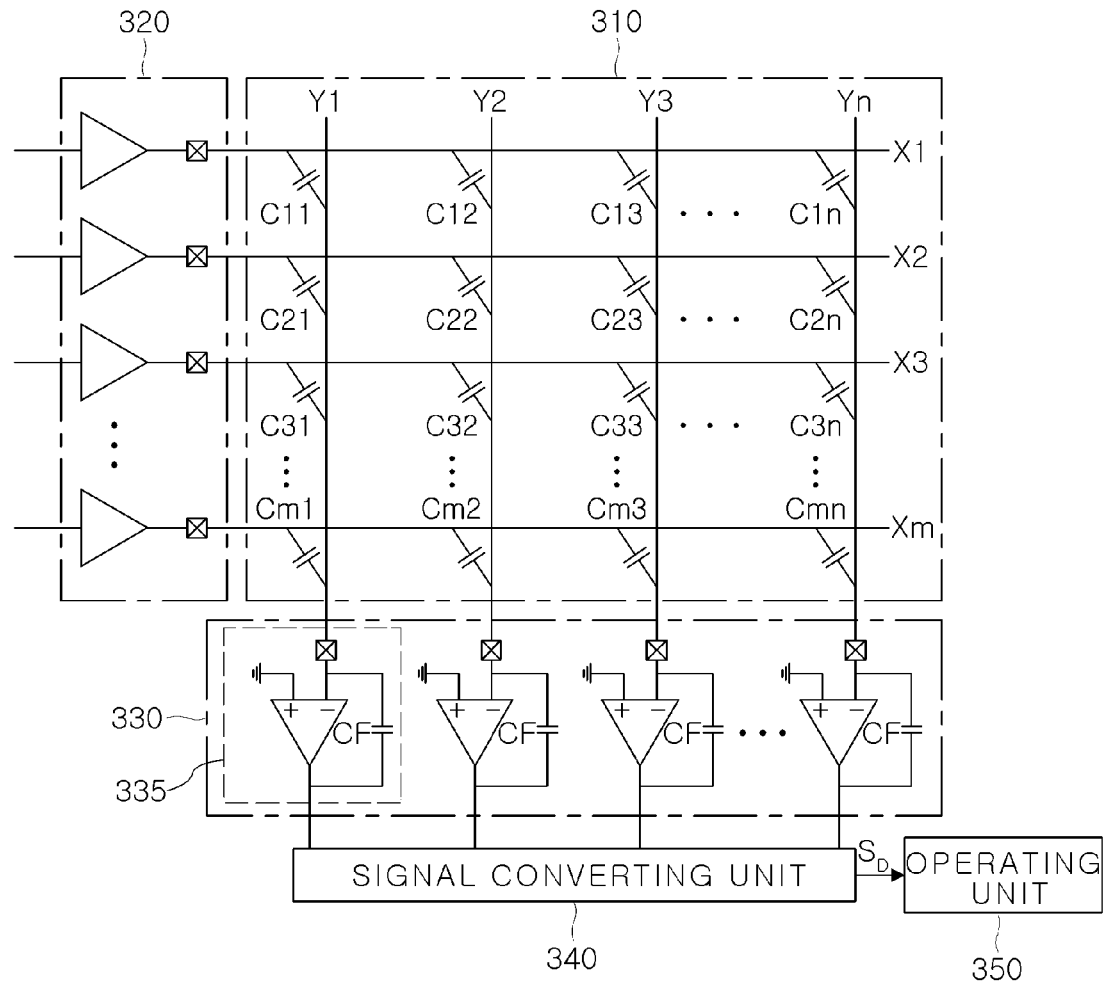
FIG. 5 is a view illustrating the touch screen apparatus according to the exemplary embodiment of the present disclosure.

FIG. 5 is a view illustrating the touch screen apparatus according to the exemplary embodiment of the present disclosure.

Referring to FIG. 5, the touch screen apparatus according to this exemplary embodiment may include a panel unit 310, a driving circuit unit 320, a sensing circuit unit 330, a signal converting unit 340, and an operating unit 350. In this case, the driving circuit unit 320, the sensing circuit unit 330, the signal converting unit 340, and the operating unit 350 may be implemented as a single integrated circuit (IC). The touch screen apparatus according to this exemplary embodiment may adopt the touch panel illustrated in FIGS. 2 through 5 as the panel unit 310 according to this exemplary embodiment.

The panel unit 310 may include first electrodes X1 to Xm extended in a first axis direction (a horizontal direction of FIG. 5) and disposed at a plurality of rows, and second electrodes Y1 to Yn extended in a second axis direction intersecting with the first axis direction (a vertical direction of FIG. 5) and disposed at a plurality of columns. In this case, node capacitors C11 to Cmn may equivalently represent mutual-capacitances generated at intersection points between the plurality of first electrodes X1 to Xm and the plurality of second electrodes Y1 to Yn.

The driving circuit unit 320 may apply predetermined driving signals to the plurality of first electrodes X1 to Xm of the panel unit 310. The driving signals may be square wave signals, sine wave signals, triangle wave signals, or the like, having a predetermined period and amplitude, and be sequentially applied to each of the plurality of first electrodes X1 to Xm. Although the case in which circuits for generating and applying the driving signals are individually connected to each of the plurality of first electrodes X1 to Xm, is illustrated in FIG. 5, a single driving signal generating circuit may also generate driving signals and apply the generated driving signals to each of the plurality of first electrodes X1 to Xm using a switching circuit. In addition, the touch screen apparatus may be operated in a scheme in which driving signal is simultaneously applied to all of the first electrodes X1 to Xm or selectively applied only to some of the first electrodes X1 to Xm to simply sense the presence or absence of the touch input.

The sensing circuit unit 330 may detect capacitance of the node capacitors C11 to Cmn from the plurality of second electrodes Y1 to Yn. The sensing circuit unit 330 may include a plurality of C-V converters 335 each including at least one operational amplifier and at least one capacitor, and the plurality of C-V converters 335 may each be connected to the plurality of second electrodes Y1 to Yn, respectively.

The plurality of C-V converters 335 may convert the capacitances of the node capacitors C11 to Cmn into voltage signals to output analog signals. For example, each of the plurality of C-V converters 335 may include an integration circuit integrating the capacitance. The integration circuit may integrate the capacitance to convert the capacitance into a predetermined voltage and output the converted voltage.

Although the case of the C-V converter 335 having a configuration in which a capacitor CF is disposed between an inverting terminal and an output terminal of the operational amplifier is illustrated in FIG. 5, a position of a circuit configuration may be changed. Further, although the case in which the C-V converter includes one operational amplifier and one capacitor is illustrated in FIG. 5, the C-V converter may include a plurality of operational amplifiers and a plurality of capacitors.

In the case in which the driving signals are sequentially applied to the plurality of first electrodes X1 to Xm, since the capacitances may be simultaneously detected from the plurality of second electrodes Y1 to Yn, the number of provided C-V converters 335 may be the same as n, which is the number of the plurality of second electrodes Y1 to Yn.

The signal converting unit 340 may generate a digital signal $S_D$ from an analog signal output from the sensing circuit unit 330. For example, the signal converting unit 340 may include a time-to-digital converter (TDC) circuit measuring time required until the analog signal output in a voltage form by the sensing circuit unit 330 arrives at a predetermined reference voltage level and converting the measured time into the digital signal $S_D$, or an analog-to-digital converter (ADC) circuit measuring an amount by which a level of the analog signal output from the sensing circuit unit 330 is changed for a predetermined time and converting the amount of change into the digital signal $S_D$.

The operating unit 350 may judge a touch input applied to the panel unit 310 using the digital signal $S_D$. The operating unit 350 may determine the number, coordinates, gesture operations, or the like, of touch inputs applied to the panel unit 310 using the digital signal $S_D$.

The digital signal $S_D$ on which the operating unit 350 determines the touch input based may be data obtained by digitizing the change in capacitance of C11 to Cmn. Particularly, the digital signal $S_D$ may be data indicating a change in capacitance between the case in which a touch input has not occurred and the case in which a touch input has occurred. Generally, in a capacitive type touch screen apparatus, it is seen that capacitance at a region contacted by a conductive object is decreased as compared to a region that is not contacted.

Figure 6:
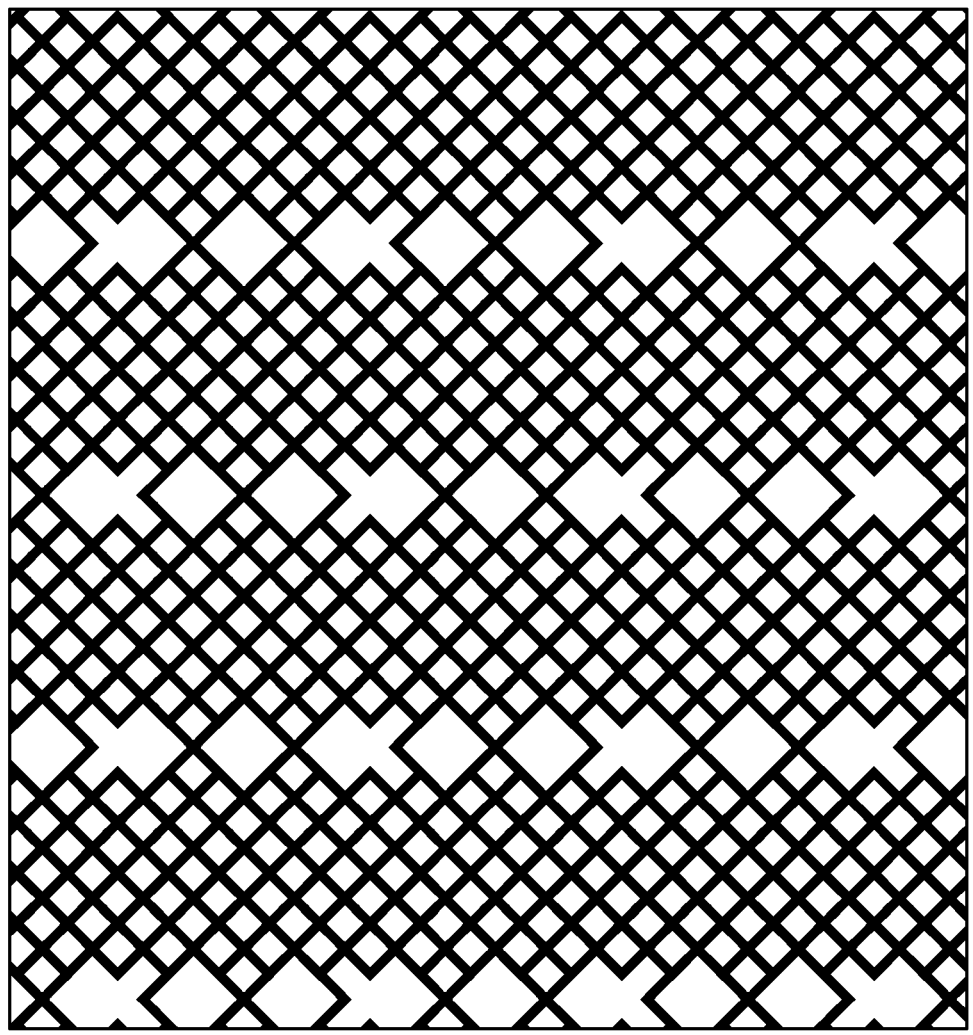
FIG. 6 is an enlarged view of the part A of the touch panel of FIG. 3.
Figure 7:
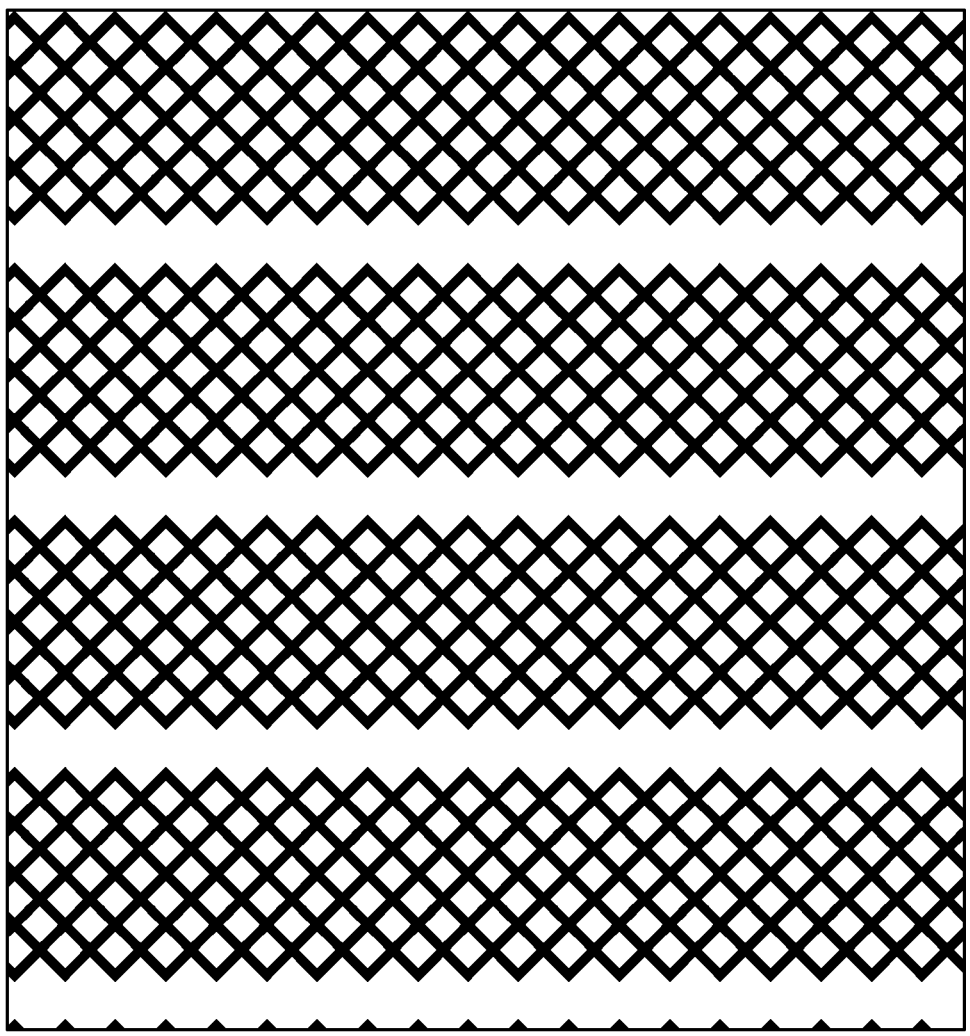
FIG. 7 is a view illustrating a first electrode illustrated in FIG. 6.
Figure 8:
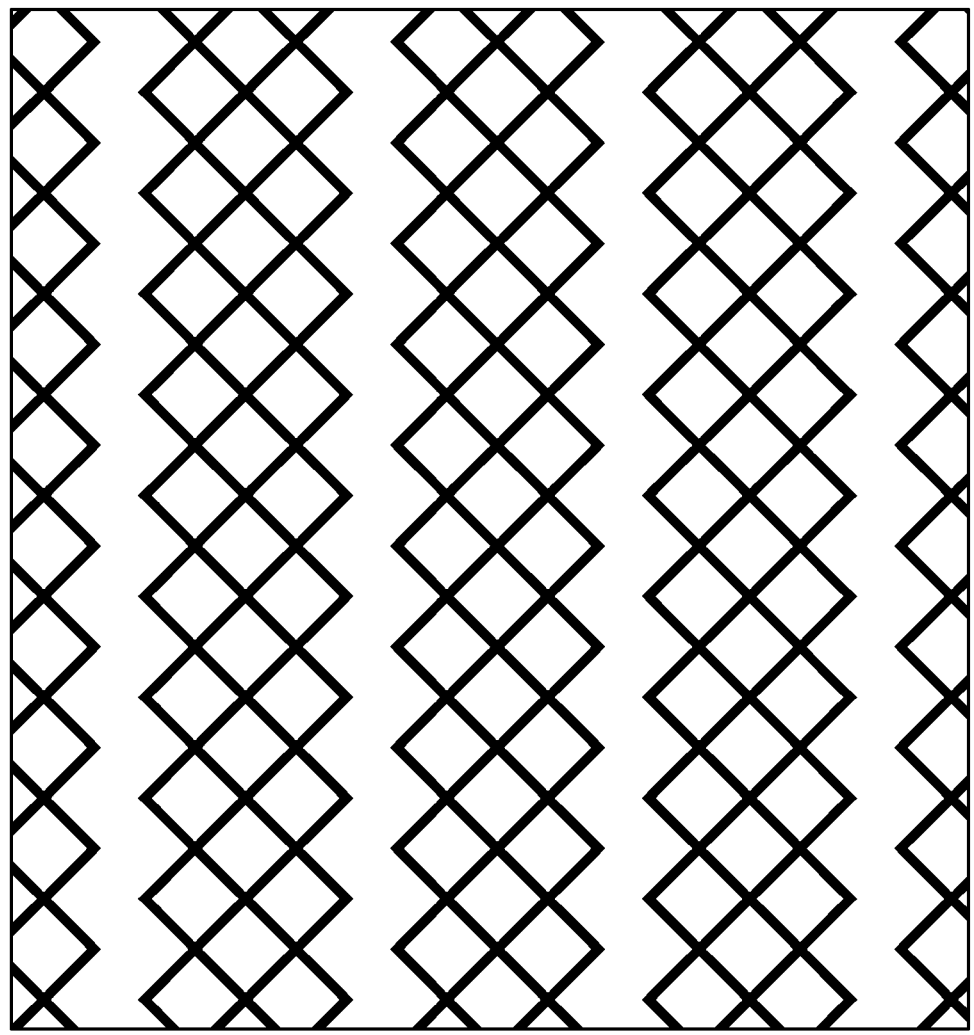
FIG. 8 is a view illustrating a second electrode illustrated in FIG. 6.

FIG. 6 is an enlarged view of the part A of the touch panel of FIG. 3; FIG. 7 is a view illustrating the first electrode illustrated in FIG. 6; and FIG. 8 is a view illustrating the second electrode illustrated in FIG. 6.

Referring to FIGS. 3 and 6 through 8, a width of the first electrode provided on a lower surface of the substrate according to this exemplary embodiment may be the same as that of the second electrode provided on an upper surface of the substrate.

In addition, a pitch of the mesh shaped conductor wire configuring the first electrode may be smaller than that of the mesh shaped conductor wire configuring the second electrode. For example, the pitch of the mesh shaped conductor wire configuring the first electrode may be 300 μm to 500 μm. The pitch of the mesh shaped conductor wire configuring the second electrode may correspond to 2 to 4 times the pitch of the mesh shaped conductor wire configuring the first electrode. In this case, a line width of the conductor wire of the first electrode may be 5 μm, and a line width of the conductor wire of the second electrode may be 3 μm.

As an example, the entire conductor wire of the second electrode may be overlapped with a portion of the conductor wire of the first electrode at the intersection region between the first and second electrodes to form a single line shape. That is, since the pitch of the conductor wire of the second electrode is larger than that of the conductor wire of the first electrode, the entire conductor wire of the second electrode may be overlapped with the portion of the conductor wire of the first electrode.

The following Table 1 shows simulation data of the touch panel of FIG. 3. Comparative Example of Table 1 corresponds to a touch screen apparatus in which widths of the first and second electrodes are identical to each other, and the pitches of the conductor wires configuring the first and second electrodes are identical to each other. In addition, Inventive Example of FIG. 6 in Table 1 corresponds to a touch screen apparatus in which the pitch of the conductor wire of the second electrode is 3 times the pitch of the conductor wire of the first electrode.

TABLE 1

| Reference | | Comparative Example | Inventive Example of FIG. 6 |
|---|---|---|---|
| Capacitance (Cm, pF) Before Touch Input | | 0.978 | 1.213 |
| Change Amount (ΔCm, pF) of Capacitance After Touch Input | | 0.162 | 0.186 |
| Change Ratio (%) of Capacitance | | 16.6 | 15.3 |
| Capacitance by Noise (C_noise (pF)) | Contact Object Noise | 0.405 | 0.362 |
| | LCD Noise | 0.331 | 0.201 |
| SNR INDEX (ΔCm/C_noise) | | 0.220 | 0.330 |

Comparing Comparative Example and Inventive Example of FIG. 6 illustrated in Table 1, it may be appreciated that in the Comparative Example and the Inventive Example of FIG. 6, the change amounts of the capacitance were 0.162 pF and 0.168 pF, respectively, such that the change amount in the Inventive Example of FIG. 6 was higher than in the Comparative Example, but the change ratios were 16.4% and 15.3%, respectively, such that the change ratio was higher in the Comparative Example than in the Inventive Example.

The capacitance by the contact object and the LCD noise in the Comparative Example were 0.405 and 0.331, respectively, and the capacitance by the contact object and the LCD noise in the Inventive Example were 0.362 and 0.201, respectively, such that it may be appreciated in the Inventive Example, an influence by the noise was smaller than in the Comparative Example. This may be appreciated in the case of confirming a signal-to-noise ratio (SNR) index illustrated in Table 1.

As set forth above, in the touch panel and the touch screen apparatus according to exemplary embodiments of the present disclosure, the width of the first electrode disposed on the lower surface of the substrate is the same as that of the second electrode disposed on the upper surface of the substrate, the pitch of the conductor wire of the first electrode is smaller than that of the conductor wire of the second electrode, and the conductor wire of the second electrode forms the line shape with the portion of the conductor wire of the first electrode, such that the touch panel and the touch screen apparatus may be resistant against noise introduced from the contact object and the LCD noise.

While exemplary embodiments have been shown and described above, it will be apparent to those skilled in the art that modifications and variations could be made without departing from the spirit and scope of the present disclosure as defined by the appended claims.

What is claimed is:

1. A touch panel, comprising:
 a substrate;
 a plurality of first electrodes disposed on a lower surface of the substrate and extended in a first direction; and
 a plurality of second electrodes disposed on an upper surface of the substrate and extended in a second direction intersecting with the first direction,
 wherein the first electrodes include first conductor wires formed in a mesh shape, and the second electrodes include second conductor wires formed in a mesh shape,
 wherein a plurality of the first conductor wires are hidden by the second conductor wires when viewed in a direction perpendicular to the first and second directions,
 wherein the second conductor wires form overlapping linear sections each in parallel superimposed relation with a respective plurality of the first conductor wires, wherein a pitch of the second conductor wires is larger than a pitch of the first conductor wires, so that the first conductor wires have overlapping conductor wires and non-overlapping conductor wires, wherein the overlapping conductor wires are formed in a mesh shape, and a pitch of the overlapping conductor wires is larger than the pitch of the first conductor wires.

2. The touch panel of claim 1, wherein widths of the first and second electrodes are identical to each other.

3. The touch panel of claim 1, wherein the pitch of the conductor wire of the second electrode is 2 to 4 times the pitch of the conductor wire of the first electrode.

4. The touch panel of claim 3, wherein the pitch of the conductor wire of the second electrode is 3 times the pitch of the conductor wire of the first electrode.

5. The touch panel of claim 3, wherein the pitch of the conductor wire of the first electrode is 300 μm to 500 μm.

6. The touch panel of claim 1, wherein a line width of the conductor wire of the first electrode is wider than that of the conductor wire of the second electrode.

7. The touch panel of claim 6, wherein the line width of the conductor wire of the first electrode is 5 μm.

8. The touch panel of claim 6, wherein the line width of the conductor wire of the second electrode is 3 μm.

9. The touch panel of claim 1, wherein a path of each of the second conductor wires directly overlap a path of each of a respective plurality of the first conductor wires.

10. A touch screen apparatus, comprising:
a panel unit including a plurality of first electrodes disposed on a lower surface of a substrate and extended in a first direction and a plurality of second electrodes disposed on an upper surface of the substrate and extended in a second direction intersecting with the first direction; and
a controlling unit applying predetermined driving signals to the plurality of first electrodes and detecting capacitance from the plurality of second electrodes to determine touch input, wherein the first electrodes include first conductor wires formed in a mesh shape, and the second electrodes include second conductor wires formed in a mesh shape, wherein, a plurality of the first conductor wires are hidden by the second conductor wires when viewed in a direction perpendicular to the first and second directions, wherein the second conductor wires form overlapping linear sections each in parallel superimposed relation with a respective plurality of the first conductor wires, wherein a pitch of the second conductor wires is larger than a pitch of the first conductor wires, so that the first conductor wires have overlapping conductor wires and non-overlapping conductor wires, wherein the overlapping conductor wires are formed in a mesh shape, and a pitch of the overlapping conductor wires is larger than the pitch of the first conductor wires.

11. The touch screen apparatus of claim 10, wherein widths of the first and second electrodes are identical to each other.

12. The touch screen apparatus of claim 10, wherein the pitch of the conductor wire of the second electrode is 2 to 4 times the pitch of the conductor wire of the first electrode.

13. The touch screen apparatus of claim 12, wherein the pitch of the conductor wire of the second electrode is 3 times the pitch of the conductor wire of the first electrode.

14. The touch screen apparatus of claim 12, wherein the pitch of the conductor wire of the first electrode is 300 μm to 500 μm.

15. The touch screen apparatus of claim 10, wherein a line width of the conductor wire of the first electrode is wider than that of the conductor wire of the second electrode.

16. The touch screen apparatus of claim 15, wherein the line width of the conductor wire of the first electrode is 5 μm.

17. The touch screen apparatus of claim 15, wherein the line width of the conductor wire of the second electrode is 3 μm.

* * * * *